United States Patent
Finkel et al.

(10) Patent No.: US 11,132,752 B2
(45) Date of Patent: Sep. 28, 2021

(54) INTEGRITY MANAGEMENT SYSTEM TO MANAGE AND CONTROL DATA BETWEEN ENTITIES IN AN OIL AND GAS ASSET SUPPLY CHAIN

(71) Applicant: SICPA HOLDING SA, Prilly (CH)

(72) Inventors: Charles Finkel, New York, NY (US); Mark Campbell, Lausanne (CH); Christophe Van Ngoc Ty, Geneva (CH); Giorgio Caset, Le Mont-sur-Lausanne (CH); Friedrich Koebler, Riaz (CH); Aksel Nielsen, Nyon (CH)

(73) Assignee: SICPA HOLDING SA, Prilly (CH)

(*) Notice: Subject to any disclaimer, the term of this patent is extended or adjusted under 35 U.S.C. 154(b) by 558 days.

(21) Appl. No.: 15/317,368

(22) PCT Filed: Jun. 8, 2015

(86) PCT No.: PCT/US2015/034664
§ 371 (c)(1),
(2) Date: Dec. 8, 2016

(87) PCT Pub. No.: WO2015/191444
PCT Pub. Date: Dec. 17, 2015

(65) Prior Publication Data
US 2017/0140469 A1    May 18, 2017

Related U.S. Application Data

(63) Continuation of application No. PCT/US2014/041551, filed on Jun. 9, 2014.

(51) Int. Cl.
*G06Q 40/00* (2012.01)
*G06Q 50/06* (2012.01)
*G06Q 10/06* (2012.01)

(52) U.S. Cl.
CPC ....... *G06Q 40/10* (2013.01); *G06Q 10/06393* (2013.01); *G06Q 50/06* (2013.01)

(58) Field of Classification Search
CPC .. G06Q 40/10; G06Q 40/12; G06Q 10/06393; G06Q 50/06
See application file for complete search history.

(56) References Cited

U.S. PATENT DOCUMENTS 7,747,484 B2 * 6/2010 Stanley ............... G06Q 40/123
                                                      705/31
8,275,719 B1 * 9/2012 Agnew ................ G06Q 40/04
                                                      705/309

(Continued)

FOREIGN PATENT DOCUMENTS

WO   WO-2011035151 A2 *  3/2011  ............ G06Q 10/00
WO   WO-2015152880 A1 * 10/2015  ............ E21B 43/00

OTHER PUBLICATIONS

David Loshin, Monitoring Data Qualifty Performance Using Data Quality Metrics, Informatica White Paper, Nov. 2006 (Year: 2006).*

(Continued)

*Primary Examiner* — Alexander G Kalinowski
*Assistant Examiner* — William B. Bunker
(74) *Attorney, Agent, or Firm* — Muncy, Geissler, Olds & Lowe, P.C.

(57) ABSTRACT

The disclosure generally relates to a system and method for managing and controlling data between entities in an oil and gas asset supply chain, and in particular to an excise tax management system and method to identify and reconcile tax filings, production volumes and operational reports. A data management system collects first data captured from a sensor or a data collector and second data provided by one of a subsidiary, franchise and third party contractor. The data management system secures and clusters the first data to generate one of a secure tax report, a tax estimation and tax (Continued)

information related to a key performance indicator (KPI), and secures and clusters the second data to generate one of secure data, a secure financial report related to one of the subsidiary, franchise and third party contractor of the oil and gas supply chain.

15 Claims, 11 Drawing Sheets

(56) References Cited

U.S. PATENT DOCUMENTS

| | | | | |
|---|---|---|---|---|
| 8,341,106 | B1* | 12/2012 | Scolnicov | G01F 1/50 |
| | | | | 706/47 |
| 8,346,635 | B1* | 1/2013 | Olim | G06Q 40/12 |
| | | | | 705/30 |
| 9,298,925 | B1* | 3/2016 | Crittall | G06F 21/577 |
| 9,971,324 | B2* | 5/2018 | Nordh | G05B 23/0264 |
| 2003/0055754 | A1 | 3/2003 | Sullivan | |
| 2004/0034578 | A1 | 2/2004 | Oney et al. | |
| 2006/0173760 | A1* | 8/2006 | Kornfeld | G06Q 10/06 |
| | | | | 705/35 |
| 2006/0191993 | A1 | 8/2006 | Markham et al. | |
| 2007/0247331 | A1* | 10/2007 | Angelis | G01D 4/006 |
| | | | | 340/870.02 |
| 2009/0225630 | A1* | 9/2009 | Zheng | E21B 47/00 |
| | | | | 367/81 |
| 2011/0071963 | A1* | 3/2011 | Piovesan | G06Q 10/00 |
| | | | | 706/11 |
| 2013/0277425 | A1* | 10/2013 | Sharma | G06Q 10/087 |
| | | | | 235/376 |
| 2014/0058775 | A1* | 2/2014 | Siig | G06Q 10/06 |
| | | | | 705/7.12 |
| 2015/0046701 | A1* | 2/2015 | Rooyakkers | H04L 9/3263 |
| | | | | 713/156 |
| 2017/0003200 | A1* | 1/2017 | McDowell | F17D 5/06 |

OTHER PUBLICATIONS

Anonymous, "Enhanced Services for Manufacturers and Partners: Supply Chain Management Tools Offering Visibility, Tracking, and Payment Services," Ip.com No. IPCOM000191159D (Year: 2009).*

Alexander Siedschlag, Editor, "Scenario-based Security Foresight," Information and Security, An International Journal, vol. 29, Procon Ltd. (Year: 2013).*

International Search Report and Written Opinion issued with respect to application No. PCT/US2015/34664.

Eurasia office action in counterpart Eurasian Application No. 201591356/31 dated Oct. 27, 2016 (and English language translation).

The web article *"Improving the accounting of natural gas supplies to consumers"* by Bobrov M.N., Chekletsov A.L. which can be found at https://indusoft.com.ua/publications/sovershenstvovanye-ucheta-postavok-pryrodnoho-haza-potrebyteliam/, Jul. 24, 2007, 10 pages.

Eurasian Office Action in counterpart Eurasian Application No. 201591356/31 dated Jun. 15, 2020 (along with the English language translation of the Office Action).

* cited by examiner

INTEGRITY MANAGEMENT SYSTEM TO MANAGE AND CONTROL DATA BETWEEN ENTITIES IN AN OIL AND GAS ASSET SUPPLY CHAIN

CROSS-REFERENCE TO RELATED APPLICATIONS

The present application claims priority to International Application No. PCT/US2014/041551 filed Jun. 9, 2014, the disclosure of which is expressly incorporated by reference herein in its entirety.

BACKGROUND

1. Field of the Disclosure

The present disclosure generally relates to a system and method for managing and controlling data between entities in an oil and gas asset supply chain, and in particular to an excise tax management system and method to identify and reconcile tax filings allowing efficient tax recollection, production volumes and operational reports.

2. Background Information

The oil and gas industry is typically divided into three sectors: upstream, midstream and downstream, as illustrated in FIG. 1. The upstream sector is known as the exploration and production sector. The upstream sector includes the searching and exploration for potential underground or underwater crude oil and natural gas fields (e.g. identification of potential hydrocarbon reserves), drilling of exploratory wells, and subsequently drilling and completion of the wells that recover and bring (produce) the crude oil and/or raw natural gas to the surface. The midstream sector involves the transportation (by pipeline, rail, truck, etc.), storage, and wholesale marketing of crude or refined petroleum products. Pipelines and other numerous transport systems can be used to move crude oil from production sites to refineries and deliver the various refined products to downstream distributors. The downstream sector refers to the refining of petroleum crude oil and the processing and purifying of raw natural gas, as well as the marketing and distribution of products derived from crude oil and natural gas. The downstream sector provides consumers with products such as gasoline or petrol, kerosene, jet fuel, diesel oil, heating, oil, lubricants, waxes, asphalt, natural gas, and liquefied petroleum gas as well as hundreds of petrochemicals.

In recent years, there has been a major increase of illegal activities related to oil and gas assets. For example, the number of oil and gas thefts in areas such as Texas and Mexico has increased nearly ten times in the past ten years. Corruption, theft, tampering, stealing and other such illegal activities occur along all phases and sectors of supply chain, including upstream, midstream and downstream. Pipeline taps, crude oil diversion, trucking hijacks, underground tunnels and stealing oil in refineries are just a few examples of the types of illegal activities that have become too prevalent within the industry. With this uptick in activity, there are several challenges faced by the oil and gas industry. For example, events that occur are not always related to one another geographically or otherwise, and provide a chain of fragmented events and incidents. Currently, many different solutions and technologies exist to assist in management, but they are not homogenous or compatible systems. A lack of coordinated communication and transparency among regions, functions and teams provides various challenges, and a lack of recordability and traceability of events stymies accountability. Thus, it becomes difficult to respond to such events and incidents in a timely manner, if at all. It becomes also hard for tax administration because of diversion, stealing of material to recover efficiently taxes from the subsidiaries or others providers in the oil and gas supply chain. Missing data or unreliable data could lead to underestimate the real amount of taxes that should be recovered at the state level.

As such, there exists a need to provide an intelligent management system that can address the need of monitoring and reporting or alerting illegal activities on oil and gas assets while at the same time increasing reliability, safety, regulatory compliance and environmental responsibility. Additionally, there is a need for a system that prescribes actions on the assets in the upstream, midstream and downstream sectors by remotely monitoring, analyzing, predicting events on this asset, and providing data as an alert to allow for decision making from any location. Additionally, there is a need for a system that allows creation of secure and reliable data from the upstream, midstream and downstream sectors by remotely monitoring, analyzing, predicting events on the asset from said sectors, and providing data as an alert or report to allow corporate level on oil and gas supply chain to efficiently monitor and manage all actors implies in the oil and gas supply chain. Additionally, there is a need for a system that allows edition of secure and accurate and reliable data from the upstream, midstream and downstream sectors which allow an efficient collection of the taxes along the supply chain, and allow at the state level to correctly recover the amount of tax that should be paid by the actors involved in the oil and gas supply chain. The term asset, as defined herein, includes all oil and gas products and infrastructure.

SUMMARY OF THE DISCLOSURE

The present disclosure, through one or more of its various aspects, embodiments, and/or specific features or sub-components, provides various systems, servers, methods, media, and programs for managing and controlling an excise tax management system and method to identify and reconcile tax filings, production volumes and operational reports.

The present disclosure generally relates to a system and method for managing and controlling data between entities in an oil and gas asset supply chain, and in particular to an excise tax management system and method to identify and reconcile tax filings, production volumes and operational reports.

In one embodiment, there is an integrity management system managing operation and control between at least one entity in an oil and gas supply chain, including a data integration management module collecting data from: a plurality of industrial control systems collecting first data captured from at least one of a sensor and a data collector; at least one of a subsidiary, franchise and third party contractor collecting second data captured from the oil and gas supply chain; at least one gateway securing and clustering the first data collected from the at least one of the sensor and the data collector; and a data management system collecting the first data captured from the at least one of a sensor and a data collector and the second data provided by the at least one of a subsidiary, franchise and third party contractor, wherein the data management system secures and clusters the first data to generate at least one of a secure tax report, a tax estimation and tax information related to a key performance indicator (KPI), and secures and clusters the second data to generate at least one of secure data, a secure financial report related to the at least one of the subsidiary, franchise and third party contractor of the oil and gas supply chain.

In one aspect, the secure and clustered first and second data are reported to: a first entity to create a first tax declaration from the secure and clustered first data, and a second entity to create a second tax declaration from the secure and clustered second data, wherein the first and second tax declarations are compared to verify the accuracy of the second tax declaration corresponding to the first tax declaration.

In another aspect, the secure and clustered first and second data are reported to: an excise platform interface comprising: a tax identification module to identify taxable transactions for reconciliation; an operation reporting module computing and formatting the secured and clustered first and second data; a tax compliance module to provide feedback of the formatted secured and clustered first and second data; and a data constructor to consolidate secured and clustered first and second data output from the tax identification module, the operation reporting module and the tax compliance module.

In still another aspect, the excise platform interface receives the secured and clustered first and second data generated by the data management system, thereby enabling a third entity to compare and reconcile at least one of excise tax, tax collection and the KPI generated by at least one of the first and second entities.

In yet another aspect, the data management system includes filtering and transforming the secured and clustered first and second data; extracting and annotating the filtered and transformed secured and clustered first and second data; correlating the extracted and annotated secured and clustered first and second data; and classifying the correlated secured and clustered first and second data; and sending the classified secured and clustered first and second data to a data warehouse and operational data storage.

In a further aspect, the first entity is a corporate entity and the second entity is the at least one of the subsidiary, franchise and third party contractor.

In one other aspect, the integrity management system interfaces with a tax remediation platform via an excise tax platform comprising a correlation engine receiving the consolidated secured and clustered first and second data from the excise platform interface to identify and reconcile asymmetries between the consolidated secured and clustered first and second data automatically generated by the excise platform interface and a corresponding one of the first and second tax declaration generated by the first and second entities, respectively.

In yet a further aspect, the tax remediation platform further includes: a transaction repository storing the identified and reconciled data from the correlation engine; a transaction processor to link the identified and reconciled data; a transaction archive storing archived identified and reconciled data from the correlation engine; and a data analytics module receiving processed and archived data for descriptive, diagnostic, predictive and prescriptive analysis.

In still a further aspect, the collected first and second data includes at least one of an invoice, payment, cash management, pump volume delivery, quantity of fuel transported and number of barrels of fuel.

In one aspect, the collected first and second data are flagged as related to a tax event prior to being secured and clustered.

In another aspect, the first and second tax declarations are one of a tax report, tax estimation and tax information related to the KPI, and is independently generated by the first and second entities, respectively.

In still another aspect, the plurality of industrial control systems are for an upstream, midstream and downstream portion of a supply chain for oil and gas assets.

In yet another aspect, each of the plurality of industrial control systems for the upstream, midstream and downstream portions are grouped as a single data repository.

In one other aspect, the collected first data from each of the plurality of industrial control system is provided to the data integration management module in the form of at least one of: non-secure data, secure data, separately formatted data, commonly formatted data, data with secure attributes, read only data, and non-forgeable data.

In still one other aspect, the sensor is configured to sense data associated with oil and gas assets traversing a supply chain, the data related to at least one of temperature, density, flow meter, humidity, volume, gravity, chemical composition, pressure, weight, pressure variation of a pipeline, difference in weight of a vehicle or fuel volume, GPS localization, timing of a vehicle location, geographical region, imaging, pump volume delivery, quantity of fuel transported and number of barrels of fuel, and thermal imaging; and the data collector is configured to collect additional data, associated with the oil and gas assets traversing the supply chain, and supplemental to and enhancing the interpretation of the sensed data including an invoice, payment and cash management.

In yet a further aspect, communication of the collected data from the industrial control system to the data integration management module is a secure communication to ensure integrity of the collected first and second data.

In still another aspect, the data integration management module comprises: data storage to store the collected first and second data; a data acquirer to acquire first and second data stored in the data storage and create a key value data structure from the acquired data; a data sorter to sort the structured data acquired from the data acquirer for analysis; and a data analyzer to analyze the structured data using computational models and algorithms to identify events, check the integrity of the structured data and secure the structured data to prevent tampering, wherein the data management module generates clustered events based on the analyzed data.

In another embodiment, there is an integrity management system managing operation and control between a first entity and a second entity in a supply chain, including: a plurality of industrial control systems collecting data captured from at least one of a sensor and a data collector; at least one gateway securing and clustering the data collected from at least one of the sensor and the data collector; and a data integration module receiving the data from the at least one gateway and transforming the secure collected data into at least one of a secure tax report, a tax estimation and tax information related to a key performance indicator (KPI) using an excise platform interface, thereby enabling the first entity to efficiently compare and reconcile at least one of excise tax, tax collection and KPI from the second entity.

In still another embodiment, there is a method of managing operation and control between at least one entity in an oil and gas supply chain, including: collecting first and second data at a data integration management module, including: capturing the first data from at least one of a sensor and a data collector using a plurality of industrial control systems; capturing the second data provided from at least one of a subsidiary, franchise and third party contractor collected from the oil and gas supply chain; securing and clustering the first data collected from the at least one of the sensor and the data collector via at least one gateway; and collecting, at a data management system, the first data captured from the at least one of a sensor and a data collector and the second data provided by the at least one of a subsidiary, franchise and third party contractor, wherein the data management system secures and clusters the first data to generate at least one of a secure tax report, a tax estimation and tax information related to a key performance indicator (KPI), and secures and clusters the second data to generate at least one of secure data, a secure financial report related to the at least one of the subsidiary, franchise and third party contractor of the oil and gas supply chain.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

The present disclosure, through one or more of its various aspects, embodiments and/or specific features or sub-components, is thus intended to bring out one or more of the advantages as specifically noted below.

Figure 1:
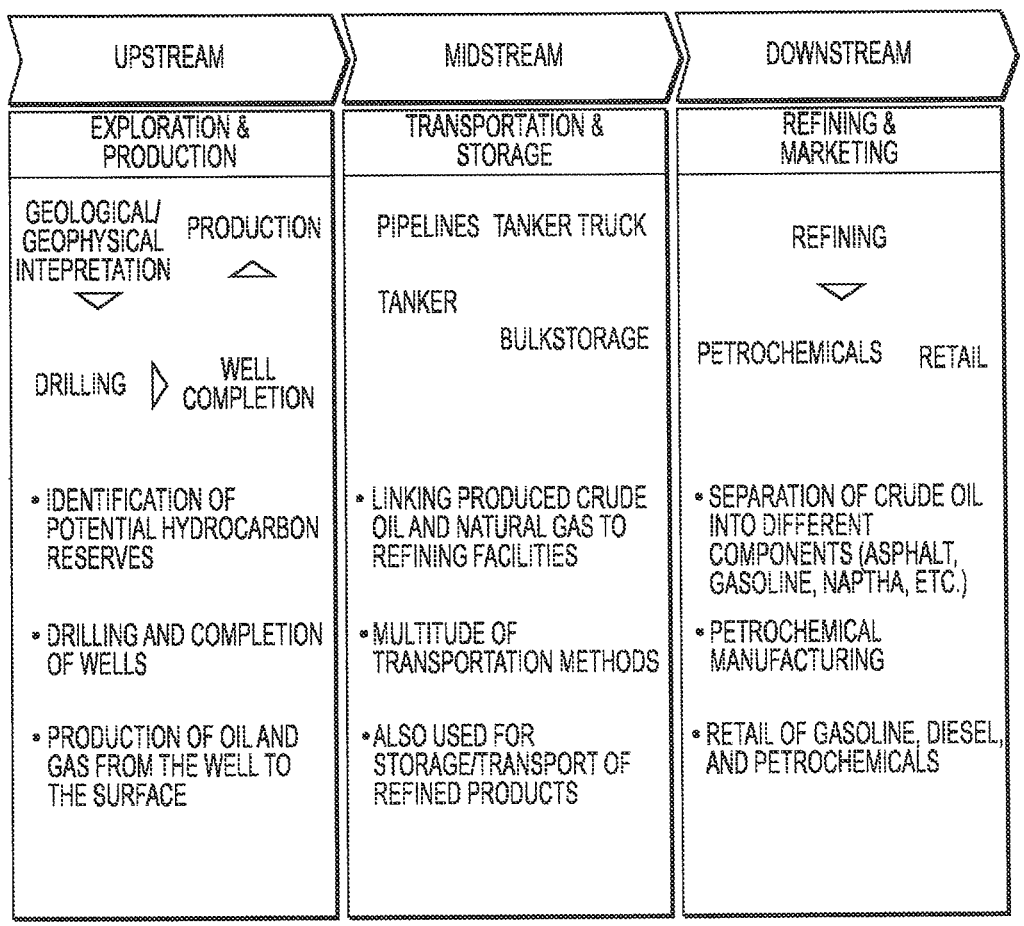
FIG. 1 is an exemplary supply chain for use in the oil and gas industry.
Figure 2:
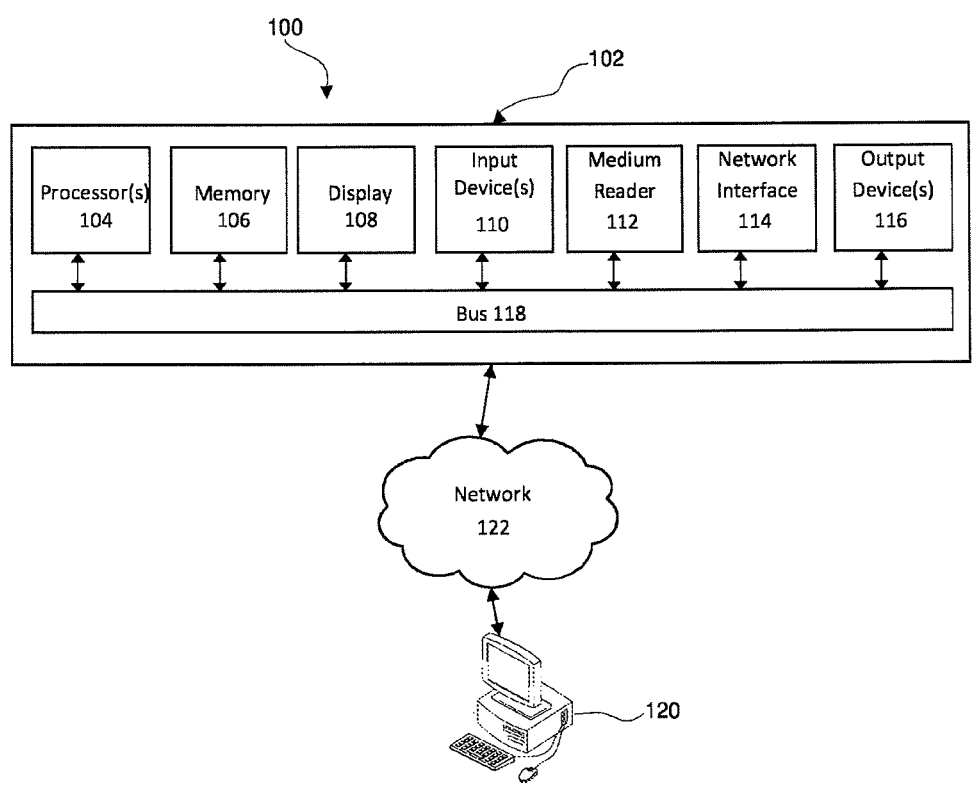
FIG. 2 is an exemplary system for use in accordance with the embodiments described herein.

FIG. 2 is an exemplary system for use in accordance with the embodiments described herein. The system 100 is generally shown and may include a computer system 102, which is generally indicated. The computer system 102 may operate as a standalone device or may be connected to other systems or peripheral devices. For example, the computer system 102 may include, or be included within, any one or more computers, servers, systems, communication networks or cloud environment.

The computer system 102 may operate in the capacity of a server in a network environment, or the in the capacity of a client user computer in the network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 102 is illustrated, addition embodiments may include any collection of systems or sub-systems that individually or jointly execute instructions or perform functions.

As illustrated in FIG. 2, the computer system 102 may include at least one processor 104, such as, for example, a central processing unit, a graphics processing unit, or both. The computer system 102 may also include a computer memory 106. The computer memory 106 may include a static memory, a dynamic memory, or both. The computer memory 106 may additionally or alternatively include a hard disk, random access memory, a cache, or any combination thereof. Of course, those skilled in the art appreciate that the computer memory 106 may comprise any combination of known memories or a single storage.

As shown in FIG. 2, the computer system 102 may include a computer display 108, such as a liquid crystal display, an organic light emitting diode, a flat panel display, a solid state display, a cathode ray tube, a plasma display, or any other known display.

The computer system 102 may include at least one computer input device 110, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 and a network interface 114. Furthermore, the computer system 102 may include any additional devices, components, parts, peripherals, hardware, software or any combination thereof which are commonly known and understood as being included with or within a computer system, such as, but not limited to, an output device 116. The output device 116 may be, but is not limited to, a speaker, an audio out, a video out, a remote control output, or any combination thereof.

Each of the components of the computer system 102 may be interconnected and communicate via a bus 118. As shown in FIG. 2, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, or any other network commonly known and understood in the art. The network 122 is shown in FIG. 2 as a wireless network. However, those skilled in the art appreciate that the network 122 may also be a wired network.

The additional computer device 120 is shown in FIG. 2 as a personal computer. However, those skilled in the art appreciate that, in alternative embodiments of the present application, the device 120 may be a laptop computer, a tablet PC, a personal digital assistant, a mobile device, a palmtop computer, a desktop computer, a communications device, a wireless telephone, a personal trusted device, a web appliance, a television with one or more processors embedded therein and/or coupled thereto, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

Figure 3:
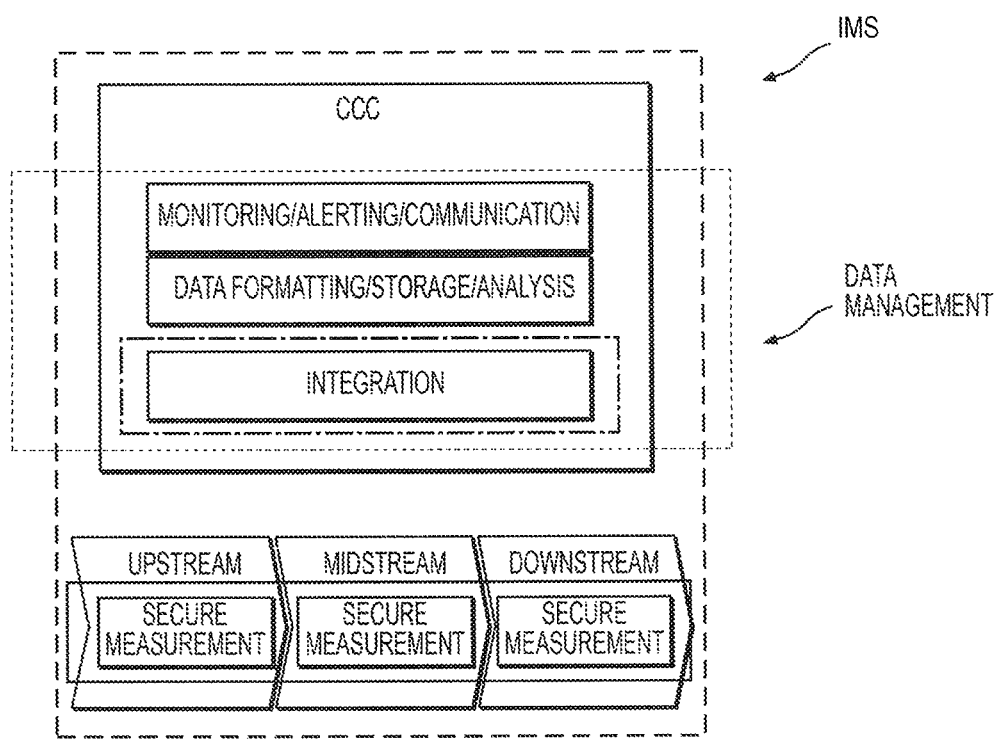
FIG. 3 is an exemplary diagram of an integrity management system in accordance with an embodiment of the disclosure.

FIG. 3 is an exemplary diagram of an integrity management system in accordance with an embodiment of the disclosure. The integrity management system IMS includes, but is not limited to, a control center CCC, a data management system, and sensors used for secure measurement. The integrity management system IMS manages oil and gas assets in a secure manner (or non-secure manner, if desirable) by monitoring for tax related activities on the supply chain, alerting corporate entities and their subsidiaries, future partners and franchises, and/or advising a tax administration (also an entity) of such activities in an appropriate manner. For example, the system may alert one of the entities that a taxable event has occurred, provide a tax report to one of the entities, forecast or predict tax data, and provide recommendations and/or respond automatically. It is appreciated that the examples provided are non-limiting and that any number of responses may be provided as understood in the art. It is also appreciated that the integrity management system IMS is not limited to management of tax related activities, but may also be employed as an alert and monitoring system or any other use typically contemplated by a management system. The system may equally be employed for the management and control of the entities in a supply chain to identify and reconcile taxable events. Additionally, as explained in detailed below, the control center CCC utilizes data over time to detect and calculate trends and future events.

The integrity management system IMS is provided information from sensor(s) and data collector(s) located at various geographical positions and regions along the supply chain, and are in the form of any well known sensor or data collector capable of sensing or collecting data given the nature of the data that it is intending to capture. The sensors are configured to capture and collect data associated with the oil and gas assets traversing a supply chain, the data including, but not limited to, at least one of temperature, density, humidity, volume of oil and or gas extracted, volume of oil and or gas transported, volume of petrol sold at the gas station, gravity, chemical composition, pressure, weight, pressure variation of a pipeline, difference in weight of a vehicle or fuel volume, GPS localization, timing of a vehicle location, geographical region, flow rate, conductivity, rheology, turbidity, imaging, thermal imaging. Additionally the sensors may sense and collect, sensor status (i.e. fault functioning, disconnect, etc.), strain gauges, weather related data, traffic, vehicle or road condition, wind speed, barometric conditions, rainfall, maintenance data or maintenance date, personal position information (e.g. location of closest fireman or police facilities) radar, motion detectors, RF data, acoustic data, GPS position, data extracted from drones, stock value of petrol, pump volume delivery, quantity of fuel transported and number of barrels of fuel, and thermal imaging, etc. Information may also be collected by data collectors. For example, information and data contained in an SAP™ or Oracle™ repository which could be any data, forecast, purchase of products, tax value, invoice generation, payment, cash management, etc.

Sensors and data collectors (sensing and collecting data in the form of secure measurements) may be located in the upstream sector, midstream sector and/or downstream sector of the oil and gas asset supply chain. The data are collected and sent to the gateway (illustrated as part of the industrial control system ICS in FIG. 6, although may also be separate from the ICS). The gateway is a collector of data from a variety of sources (e.g. ICS such as SCADA, the ICS using protocols such as MODBUS, AS-iOPC, EtherCAT, etc.) and includes a business rules engine (BRE). The gateway may also collect data directly from the sensor, data collectors or any device providing data within the upstream, midstream and downstream sectors. The collected data may be transformed into secure (or additional secured) data that includes, for example, a timestamp and various attributes. Once the data is transformed by the gateway, the data is sent (preferably securely) to the data integration module. Additionally or alternatively, the collected data may be stored in a repository or multiple repositories and then sent the integrity management system IMS, where the clustered events will be generated from the data. It is also appreciated that the collected data need not come from the sources listed above, but may come from any internal or external source of data.

The data integration module includes a data management system DMS that, in one embodiment, stores the data, acquires the data from storage, and creates a key value data structure from the data, sorts the structure data and analyzes the structured data using computational models and algorithms to identify events. The data is also checked for integrity of the structured data and the secureness of the structured data to prevent tampering. The clustered events are generated by the data management system DMS for use by the control center CCC. The control center CCC (which may comprise processor(s), software, an interface(s), and multiple displays, and/or personnel to control and command information on the integrity management system IMS, and or, for example, any of the components described in FIG. 2, and which may be provided locally or remotely at any geographical location, mobile or otherwise) performs monitoring of tax related events and alerts, creates tax related alerts and provides decisions based on the clustered events generated from the data management system. The control center also provides communication with external operational support and personnel and resources. The data management system DMS is also described below in another embodiment with reference to FIG. 6.

The computation models and algorithms used in the integrity management system IMS are not limited to any particular model or algorithm. Rather, it is appreciated that any number of solutions may be used in this system. However, as an example, a data mining algorithm that is a set of heuristics and calculations that creates a data mining model from data. To create a model, the algorithm first analyzes the data provided and looks for types of patterns or trends. The algorithm uses the results of the analysis to define optimal parameters for creating the mining model. These parameters are then applied across the entire data set to extract actionable patterns and detailed statistics. The mining model that an algorithm creates from collected data can take various forms, including: a set of clusters (e.g. clustered events) that describe how the cases (e.g. events) in a dataset are related; a decision tree that predicts an outcome, and describes how different criteria affect that outcome. Using the data mined by the algorithms, the system is able to utilize historical data and improve accuracy over time. The accuracy may also be supplemented by human verification at the location an event occurs, and using the alerts generated by the system.

Figure 4:
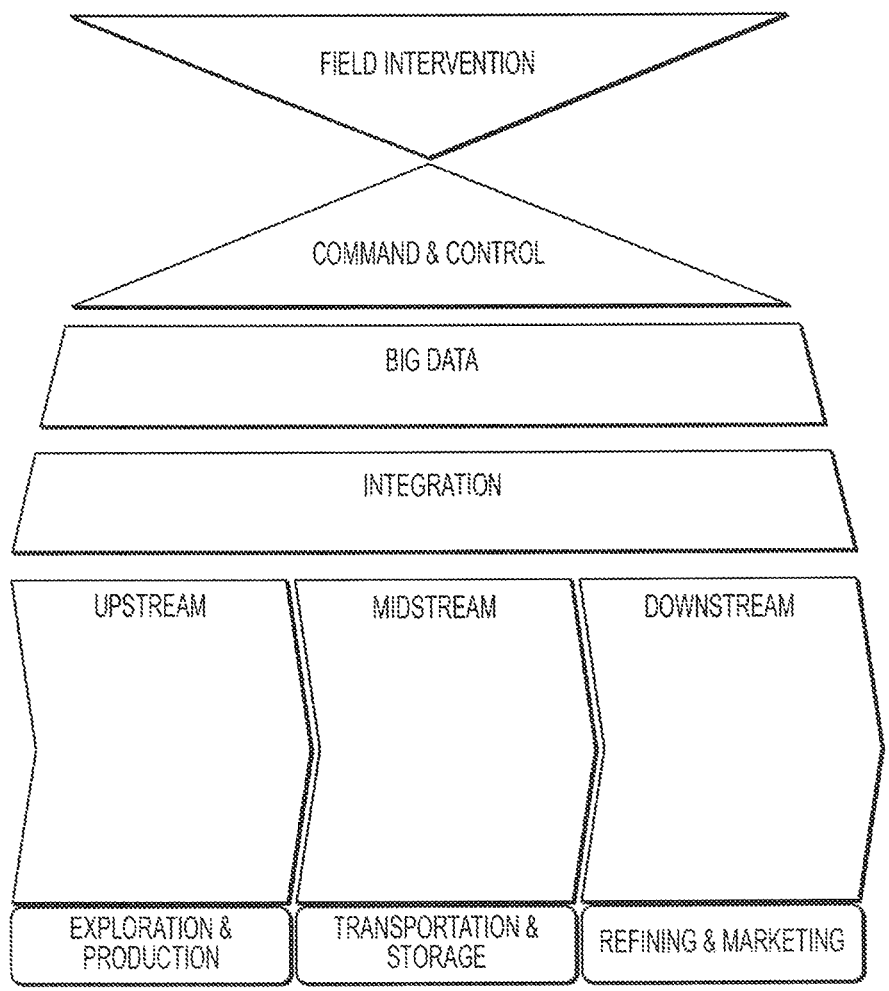
FIG. 4 is another exemplary diagram of an integrity management system in accordance with an embodiment of the disclosure.

FIG. 4 is another exemplary diagram of an integrity management system in accordance with an embodiment of the disclosure. The diagram illustrates a flow of data from the initial sensing and collecting of data at the upstream, midstream and downstream sectors all the way through excise tax remediation that may occur as a result of the monitoring and alerts provided by the control center CCC. Within each stream (sector), there are multiple technologies, assets and generations of assets. These technologies are not consolidated and therefore not monitored together. The integration of the collected data interfaces between the various technologies and systems, provides communication between the technologies and systems that have different protocols and integrates external systems. The integrated data is formatted, stored and analyzed for use by the (command and) control center CCC. The control center CCC provides an overview of the collected data by monitoring the data provided by the data management system DMS, acting as a graphical user interface GUI with screen reporting functions and to display KPI, tax reports and/or management function.

Figure 5:
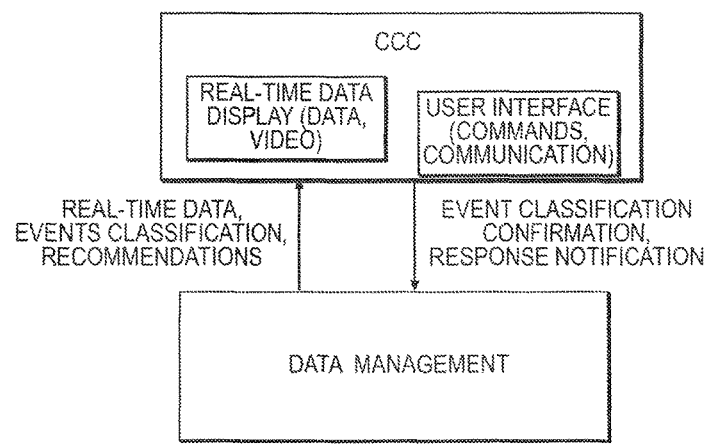
FIG. 5 illustrates an exemplary embodiment of communication between the data management system and the control center in accordance with an embodiment of the disclosure.

FIG. 5 illustrates an exemplary embodiment of communication between the data management system and the control center in accordance with an embodiment of the disclosure. The data management system DMS, in one embodiment, provides real-time data, event classification and recommendations to the control center CCC based on collected data that has been analyzed, as described above and further below. The control center CCC confirms the event classifications and responds with a notification to the data management system DMS, which may be securely logged with a timestamp. The control center CCC also performs monitoring of events and alerts, creates alerts and provides decisions based on the clustered events generated from the data management system DMS. Notifications and alerts may be presented to, for example, personnel located at the control center CCC or remotely located using any number of interfaces. Interfaces can convey information as visual information, audible information, or in any other form, and may be conveyed using mobile devices as well as non-mobile devices. The control center also provides communication with external operational support and personnel and resources. As described below, the data management system DMS may also be used, in another embodiment, to filter and transform data, extract/annotate data, correlate data, reconcile data and classify data.

Figure 6:
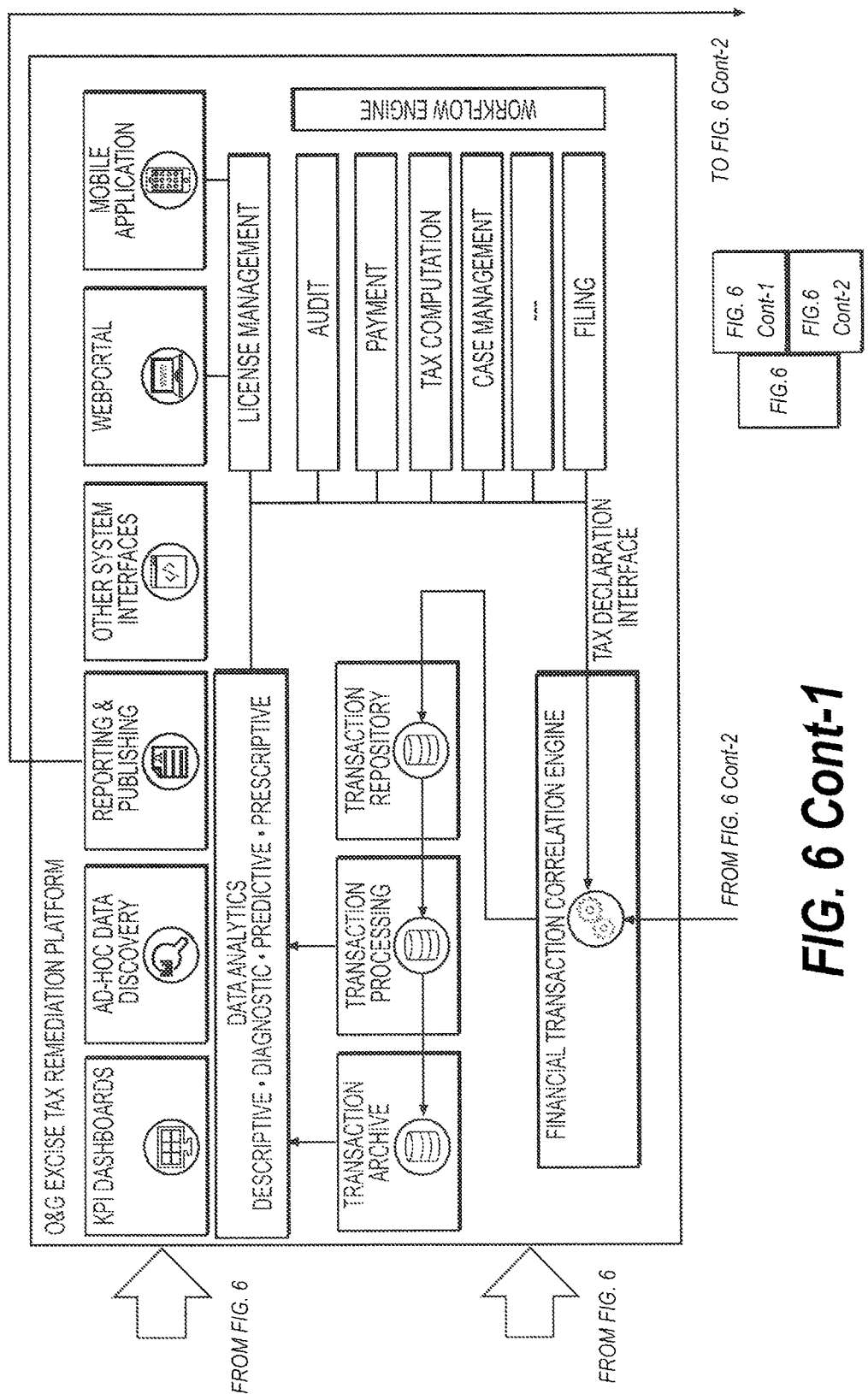
FIG. 6 is an exemplary diagram of an integrity management system in accordance with an embodiment of the disclosure.
Figure 6:
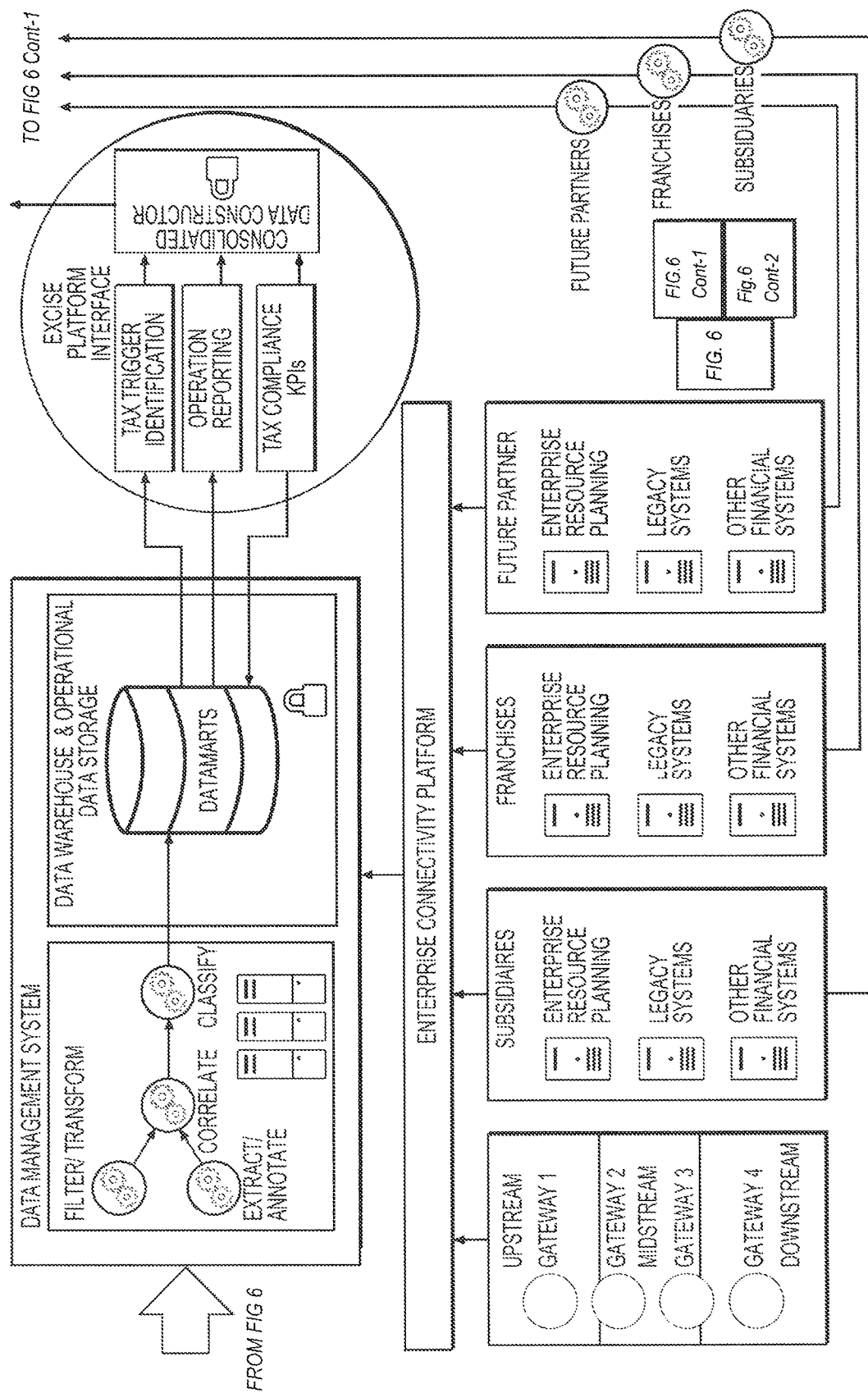

FIG. 6 is an exemplary diagram of an integrity management system in accordance with an embodiment of the disclosure. The integrity management system IMS includes, but is not limited to, which interfaces with an excise tax remediation platform via an excise platform interface (said platform is mainly software based platform), a data management system DMS, a data integration module (or enterprise connectivity platform), a gateway interface, and sensors or data collectors used for capturing data from upstream, midstream and downstream, along with various systems storing and providing data from future partners, franchises and subsidiaries of a corporate entity (not shown). The integrity management system IMS may also include or extend to external resources, field and resource management, predictive and prescriptive applications, evidence based event management and existing legacy systems. It is appreciated that the integrity management system IMS is not limited to the disclosed components, nor must it include each of the components illustrated in the non-limiting and exemplary embodiment. For example, a supervisory control and data acquisition (ICS such as SCADA) system may replace the collection of data instead of the gateway interface. As noted above, data may be stored in a single repository or multiple repositories. Gateway could also be drones having the same capabilities that a fixed gateway interfacing with supervisory control and data acquisition and that will collected the information directly from the sensors or data collectors at upstream, downstream and midstream level.

The integrity management system IMS manages and controls or interfaces with at least one entity in an oil and gas asset supply chain. The entity may include, but is not limited to, a corporate entity, future partners, franchises, subsidiaries and/or a tax administrative entity. An excise tax management system and method to identify and reconcile asymmetries between tax filings, production volumes and operational reports from the various entities. The integrity management system IMS collects the heterogeneous, unstructured and fragmented data from sensors, data collectors and monitoring sub-systems in the upstream, midstream and downstream oil and gas infrastructure (pipelines), to store and process the collected data using knowledge of the oil and gas infrastructure systems. Data is also collected via the subsidiaries, franchises and future partners, enterprise resources planning or other financial management systems such as legacy customer developed applications. The data collected from the subsidiaries, franchises and future partners may include, for example, an invoice, payment and cash management data. The data is structured for additional processing and analysis, and the integrity of the structured data is verified and secured to prevent tampering. Eventually, the data is sent to the data management system DMS, in another embodiment, for filtering/transforming, extracting/annotating, correlating, reconciling, classifying and storing.

More specifically, collected data will be acquired and processed in real-time and routed to the data management system DMS. The data management system DMS, in this embodiment, includes a filtering and transforming module, an extraction/annotation module, a correlation module and a classification module. Also provided in the data management system DMS is a data warehouse and operational data storage. The data management system DMS is responsible for filtering and transforming the data collected and captured by the sensors, collectors, subsidiary, franchise and/or future partners (which may be secured and clustered); extracting and annotating the filtered and transformed data; correlating the extracted and annotated data; and classifying the correlated data. The classified data is then sent to a data warehouse and operational data storage for storage.

The data management system DMS is also responsible for managing (and storing) data stored in its data warehouse and operational data storage to the excise platform interface. The excise platform interface includes, for example, a tax trigger identification module, an operation reporting module, a tax compliance KPI module and a consolidated data constructor module. The excise platform interfaces between the data management system DMS and the excise tax remediation platform. The excise platform interface computes and formats excise tax estimates based on a wide variety of data, including but no limited to, for example volumetric operational and financial data or sales of fuel or derived products by different entities along the oil and gas supply chain. The computed and formatted data is identified as a taxable transaction for later reconciliation, and feedback of tax related KPIs are sent to a KPI dashboard (described below) in the excise tax remediation platform. In particular, the excise platform interface identifies taxable transactions for reconciliation in the tax identification module, computes and formats data in the operation reporting module, provides feedback of the formatted data in the tax compliance module and consolidates the data output from the tax identification module, the operation reporting module and the tax compliance module in the data constructor module. Additionally, the excise platform interface receives the data (which may be secured and clustered) generated by the data management system DMS, thereby enabling an entity to compare and reconcile at least one of excise tax, tax collection and the KPI generated by another(other) entity(ies). This interface enables the integrity management system IMS to provide a built-in cross-checking and reconciliation of tax related data between independent sources of reporting. Ultimately, this affords tax payment transparency such that fraudulent activities can be minimized. As example, the tax KPIs and related tax data are complex data and should be adapted in almost real time according to specific rules provided by the state tax rules. For example, if the volume of oil sold is 5,000 barrels, the tax value could be 5 percent. When the volume of oil sold is 500,000 barrels, the tax value is only 3 percent. The tax remediation platform maintains all rules to treat the data provided by the DMS and related to tax so as to generate, based on the provided rules, the corresponding taxes that should be paid. Another example occurs downstream where a gas station would declare an amount of sales in dollars which does not correspond to the volume of product distributed to the location.

The excise tax remediation platform which is interfaced with the IMS includes, but is not limited to, a financial transaction correlation engine, data analytics (for example, descriptive, diagnostic, predictive and prescriptive), a KPI or reporting dashboard, ad-hoc data discovery, reporting and publishing module, other system interface module, a web portal, mobile applications, a workflow engine, a transaction archive, transaction processing and a transaction repository. The excise tax remediation platform receives the consolidated data from the excise platform interface (which has received secure and accurate tax related data from the DMS part of the IMS) to identify and reconcile asymmetries between the consolidated data automatically generated by the excise platform interface and a corresponding tax declaration independently or manually generated (e.g. at subsidiaries level or corporate level or any entity involved in oil and gas supply chain). The excise tax remediation platform also has a transaction repository storing the identified and reconciled data from the correlation engine, a transaction processor to link the identified and reconciled data, a transaction archive storing archived identified and reconciled data from the correlation engine; and a data analytics module receiving processed and archived data for descriptive, diagnostic, predictive and prescriptive analysis. The data sent to the data analytics module may be entered into a prediction and prescriptive analysis module (predictive and prescriptive application) that uses machine learning to identify sequences of measurements (FIG. 8A) or computed data that are classified as "events" that require some form of action and/or reporting. The classification of an event, previously supplied by the data management system, can be confirmed (by a human operator or machine) and the results sent to the prediction and prescription module to improve the training set for the learning algorithm, allowing it to "learn" over the course of time. Using machine learning, the integrity management system IMS will learn which series of event measurements taken together will indicate that a certain event or cluster of events has occurred. Using the "learned" events, the system is able to utilize historical data and improve accuracy over time. Tax reports from the tax excise remediation platform will provide oil and gas subsidiaries, partners and franchises which could include information about past declarations, their consolidations and future projections. Accordingly, the excise tax remediation platform allows for tax management with a front-end for taxpayer access, a unified tax filing and production volume repository and reconciliation, built in data analytics and a reporting dashboard for tax administration, an integrated and centralized system for oil and gas excise tax management and recovery, and identification and reconciliation of asymmetries between tax filings, production volumes and operational reports thereby providing efficient excise tax recovery. More specifically, in one embodiment, at the stage of the tax reconciliation, the system is automatically double checking a manual declaration with data automatically captured (and transformed in a secure manner and use to create useful clustered tax related data able to create secure and valid tax declaration for verification purposes). It is important to note, that one particular advantage of the IMS according to the present invention when interfacing with the tax remediation platform via the tax excise platform, is the quality of the data provided to said excise platform. The IMS will not only securely collect data from various sources, but will create secure and accurate data, which will be useful to create secure and reliable clustered data and report, useful for efficient tax recollection and correct asymmetries in the oil and gas supply chain. The IMS has also the advantage to allow at the corporate level to efficiently monitor the activity of all actors in the supply chain (subsidiaries, franchises etc.) and can manage them efficiently. All the secure collected data provided by the IMS to the corporate level will be useful to create secure and reliable report and KPI to efficiently compare with those provided at subsidiaries level or franchises level. By comparing reliable and secure report provided by the IMS at the corporate level with those from subsidiaries and franchises, an efficient management inside the supply chain of oil and gas will allow the corporate level to have a better visibility of what is wrong or not efficient and how to correct asymmetries on the oil and gas supply chain.

Figure 7:
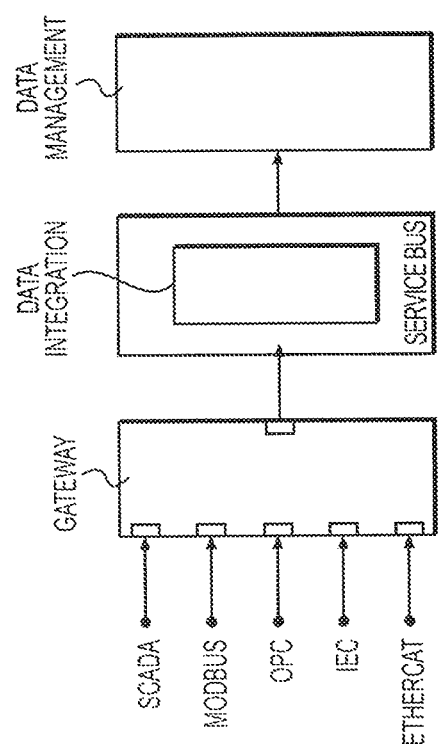
FIG. 7 illustrates an exemplary diagram of an interface in accordance with one embodiment of the disclosure.
Figure 8A:
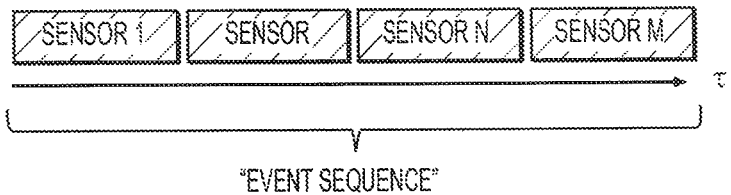
FIG. 8A-8D show an exemplary sequence of events in which the captured data occurs over time to determine a probability.
Figure 8B:
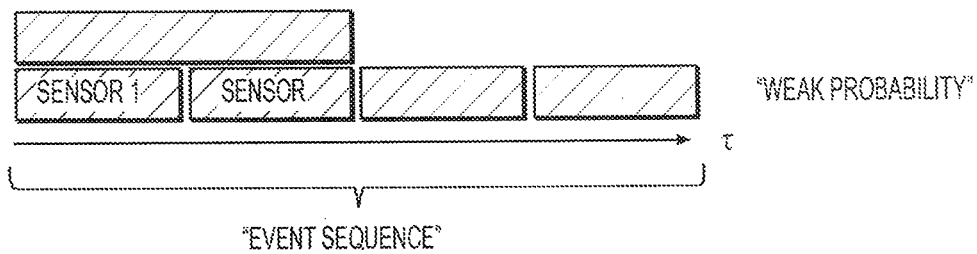
Figure 8C:
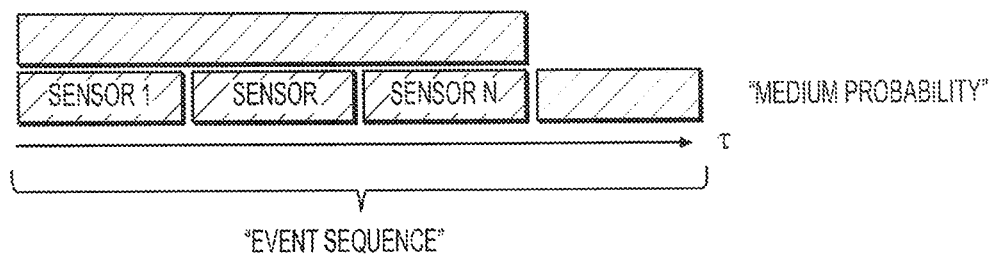
Figure 8D:
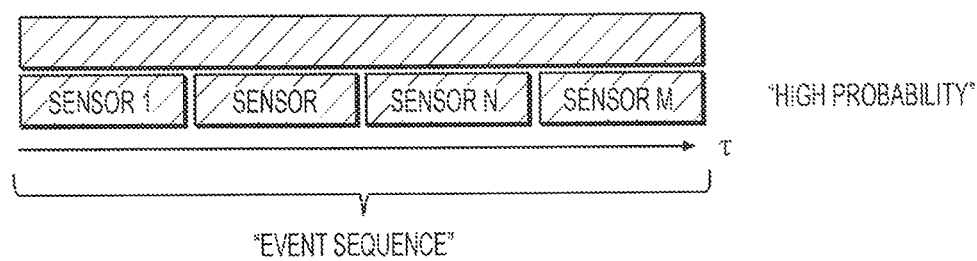

FIG. 7 illustrates an exemplary diagram of an interface in accordance with one embodiment of the disclosure. As illustrated, the interface (gateway) receives data from one or more of a variety of sources. For example, the data collected from the upstream, midstream and downstream sensors that are processed by the industrial control systems (such as a SCADA) is passed along to the gateway interface (here illustrated as part of the industrial control system). In an alternative embodiment, the gateway replaces the industrial control system and collects data directly from the upstream, midstream and downstream sensors. The gateway interface transforms (e.g. sorts, formats and modifies) the collected data into secure and formatted data that is compatible with the system, and in particular the data integration module (or ERP), prior to being sent to the data management system DMS for analysis by the integrity management system IMS. In an alternative embodiment the gateway could be a structure such as drones, collecting securely and verifying directly the data from sensors and data collectors in the upstream, midstream or downstream sectors FIGS. 8A-8D illustrate exemplary sensor measurements and sensors collecting data along a supply chain in accordance with an embodiment of the disclosure. The collected data is processed by the integrity management system to clustered and structured data are generated or directly reported as a tax report, financial report, KPI report, secure tax form or any report useful to prepare a final tax declaration. Once a particular sequence of measurements (or sequence of events) associated with an event description is known (i.e. learned by the prediction and prescription application, events can be flagged in real-time with a probability score indicating the likelihood that a sequence of measurements unfolding will result in an identifiable event (such as a taxable event or sequence of taxable events). In the figures, the shaded boxes represent the values received from a given sensor. FIG. 8A shows an exemplary number of sensors 1 . . . m that are configured to capture a sequence of events. FIGS. 8B, 8C and 8D show an exemplary sequence of events in which the captured data over the course of time t represents a weak probability, a medium probability and a high probability, respectively, of the event having occurred (termed here, the event probability). The event probability is sent to the data management system DMS, excise platform interface and excise tax remediation platform identifying a taxable event, such as 500 barrels of fuel sold at location X on a given date.

To improve efficiency, using the predictive and prescriptive module, based on past events contained in historical data of measurements and events, patterns may be generated and used from the historical data to assist in predicting future events (i.e. taxable events) before the sensors and data collectors begin to register data. Using this predictive data, the excise tax remediation platform and personnel operating the excise tax remediation platform could be alerted to predicted areas for taxable events identified by the system using data in the system, such as time of day, day of week, month or specific dates, previous event sequences, and the like. It is appreciated from the above that that the integrity management system IMS is capable of recording the evolution of tax related events, and link them together for providing a history to analyze and improve the data analysis in the data management system DMS. Based on the prior knowledge of events having occurred in the past, historical data and verification that the events actually occurred, such as pump volume delivery, quantity of fuel transported and number of barrels of fuel, payment, cash management and generation of an invoice, future events can be more accurately predicted and the events themselves may be better interpreted during monitoring and analysis. Additionally, the integrity management system IMS by virtue of its predictive and prescriptive nature is able to mitigate corruption by people, for example operating personnel at a subsidiary, third party, franchise, etc. are less likely to provide falsified tax documents given the monitoring and control by the excise tax remediation platform. Accordingly, it becomes increasingly difficult, for people involved with the illegal activities to avoid detection by deleting data, changing data, paying off personnel monitoring the data, etc.

Significantly, to avoid these types of situations from occurring, the integrity management system provides: secure and unforgeable data which may not be deleted, alerts based on the correlation of clustered events that give a high probability of falsified activity (e.g. falsification of tax related information), which activity may be displayed to an operator and recorded as alerts that are also unforgeable and may not be deleted. Alternatively or additionally, the system itself may intervene in place of personnel to identify and send urgent information to external authorities such as a tax administration, corporate governing entity, etc. Accordingly, a part of the system is to supply an alternative to human error and inadequacies in detecting such falsified information.

Further non-limiting examples of the integrity management system IMS, are provided below with respect to the midstream and downstream sectors. In the midstream sector, tax related activities typically occur by modifying collected data and/or falsifying records and materials, such as tax reports and tax declarations. For example, upon receipt of a taxable transaction, such as receipt of payment for the purchase of 500 barrels of oil, the receipt may be forged such that the excised tax is minimized. In doing so, when a tax report is being prepared, the information related to the taxable transaction will reflect the forged receipt. As countermeasures and in accordance with the objectives of the integrity management system IMS, the barrels may be lined with several sensors and/or data collectors that will monitor and collect data therefrom. For example, each barrel may have a sensor that detects when a barrel is moved from a distribution center to a retail outlet, signifying that a purchase of the barrel(s) has occurred. The integration management system IMS may be used to monitor and collect data related to the transaction as it occurs. The collected data from the sensors and data collectors will be sent to the corresponding gateway (FIG. 6) or industrial control system ICS, and escalated to the data management system DMS and on to the control center CCC, as described herein above. Additionally, the collected data should be updated in a manner that it may be interpreted to provide conclusions and recommendations. For example, if the sensor(s) or data collector(s) only detect the purchase of a barrel(s) once a week, the sensor(s) and data collector(s) may not capture the purchase activity during the remaining six days in the week. If, on the other hand, the purchasing of a barrel(s) is measured twice daily, the sensor(s) and data collector(s) will be able to more accurately detect and calculate the purchase of a barrel(s) (or any other type of data) indicating that a taxable transaction or activity is occurring. Linked with the localization of the sensor(s) and data collector(s), a drone or personnel could alternatively or simultaneously monitor the regional location, images could be captured from a local camera, and the system could be notified that the activities are underway.

Another non-limiting example of data in the midstream is a tanker truck transporting crude oil and petroleum. In this example, the collected data is GPS information generated by the trip made by the truck, and the volume of the content of the truck's tank. If the data collected over time indicates, for example, that the truck is stopping at a location longer than anticipated, or there is a variation of volume of the content of the tank, this may indicate that illegal activities are occurring or have occurred. For example, the variation of volume of the content in the tank may be an indication that someone is attempting to avoid reporting of the event as a taxable transaction. In another example, the truck can be stopped at an overnight rest area. Since these areas are a known, regular stop for an extended period, volume sensors on the truck may be activated to monitor variations in the content of the tank. Any change in variation detected by the sensors can be escalated through the data management system DMS to the control center CCC after the data has been analyzed. The system's learning engines will become aware of the region and expectation of activities in the area, and apply such knowledge in further analysis. Again, such activities could be indicative of someone attempting to avoid a specific event that has taxable consequences.

In the downstream sector, a non-limiting example is provided in which collected data includes the volume produced in a refining factory. The volume data may be linked, for example, with the number of trucks required to transport the truck's content (fuel) to retails shops. As understood, once the fuel reaches the retail shops, it is unloaded into shop tanks for storage. Here, the volume is transferred and the fuel is distributed. Sensors and data collectors may then be used to measure the corresponding volumes exchanged, and cash generated by the sale of fuel. If the volumes and sales do not match, this could indicate illegal activities, such as falsified documents being generated to avoid or elude a taxable event. This information may also be useful for tax recollection or reconciliation, to estimate the amount of fuel required in a particular region, etc. As appreciated, the data is not only collected, but also stored in a repository and transformed into a sum of clustered events that may be linked, used or analyzed for prescriptive or predictive action.

Figure 9:
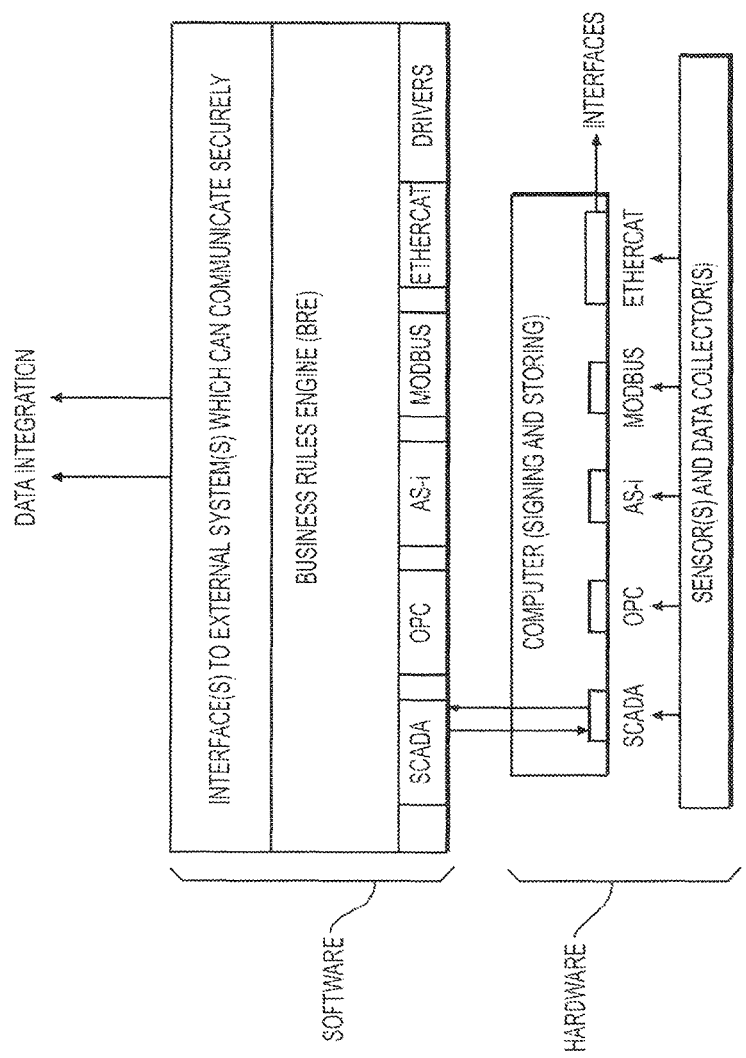
FIG. 9 is an exemplary diagram of an interface in accordance with one embodiment of the disclosure.

FIG. 9 is an exemplary diagram of an interface in accordance with one embodiment of the disclosure. The interface, in this application also referred to as the Gateway or Gateway interface, interfaces the data sensors that are positioned along the upstream, midstream and downstream sectors to external sources, such as an enterprise service bus ESB or the data integrity management system IMS via the data integration module. As illustrated, the gateway is divided into three layers including: (1) the computer (for signing and storing) which communicates with industrial control systems (such as SCADA, OPC, AS-i MODBUS and Ethercat). The drivers may be a combination of physical interfaces and software, (2) the business rules engine (BRE) which correlates, secures, authenticates, filters, reconciles, provides unforgeability, and creates key value data. The BRE will also from the data collected, make association of data collected into objects, create events based on non-integrity of objects, create events-based alert or events-based on thresholds or on business rules or on trends, and (3) the interfaces that interface with the external systems using, for example, HTTPS, SSL or any other known software or hardware protocol.

The gateway interface provides, among other features, a mechanism to manage the collected the data into a format that is further secured and which is compatible with the external system to which the transformed data or objects or events or alerts created in the Gateway will be sent. For example, the gateway interface will secure the collected data from the sensors and/or data collectors as well as formatting the collected data to be compatible with the data integration system before being used in the integrity management system IMS especially at the data management system DMS level. The gateway interface interfaces with external systems using, for example, protocols such as HTTPS, SSL, etc. External interfaces include, but are not limited to, an enterprise service bus ESB or an industrial control system ICS, such as the gateway management system IMS described herein.

At the driver layer, the drivers which communicate with external systems, such as the ICS system, may be hardware, software or any combination therefore. The hardware and software is preferably tamper resistant and secure in order to avoid attacks on the physical hardware as well as malicious attacks on the software, for example by hackers, injection of unwanted data or the like. The data that will be generated and created in the gateway interface will be more secure and provide enhanced properties in addition to those collected from the various repositories of data, such as the SCADA or ICS. The secure and enhanced data will then be provided to the integrity management system IMS and assist in creating the clustered events. The gateway will also verify that data being received from the sensor(s) and data collector(s) are authentic data and have not been corrupted by external sources or otherwise. That is, the gateway will first have the capability to authenticate data being received before securing the data and adding additional properties. This will ensure that the data to be secured and enhanced is authenticated prior to being passed to the integrity management system IMS, and will avoid corrupted data being sent to the integrity management system IMS. One weakness of existing systems in the oil and gas supply chain is the incredibly large volume of data. If the system becomes contaminated or infected with fake, counterfeit, fabricated or inaccurate data, the data captured will not be reliable and any events or clustered events created in the integrity management system IMS may potentially compromise the reports generated using the clustered events. Accordingly, any data to be accessed or used in the integrity management system IMS (via the data integration module), using the gateway, should be as secure and accurate as possible. An example of authenticating the data that will be inserted in the gateway, is to capture from the sensors, several times the information it is supposed to capture and in a short period of time and verifying that the data collected is always of the same nature (e.g. the temperature is captured ten times during 30 seconds and the value is quite the same, then the data seems to be correct). Another example of authenticating or being sure that the data is accurate is to add to the sensor an electronic system or mechanism that protect him from tampering or diversion and protect the access to the sensor by any means, the data collected from the sensor and then send to the gateway will be accurate as possible.

The gateway interface collects data either via the physical interfaces to industrial sensors utilizing industrial communication protocols, such as OPC or Ethercat, or via virtual (i.e. software) interfaces to existing monitoring or control systems, such as SCADA. The interfaces are powered, for example, using software drivers which can be dynamically loaded or unloaded depending on the physical or virtual requirements. For example, if there are three OPC powered devices and an Ether cat device physically attached, then there would be three OPC drivers and a single Ethercat driver.

Once the data reaches the gateway interface, the Business Rules Engine BRE create new monitoring data by correlating captured data, filtering irrelevant data, for example non-security related events, validating read/write access to/from the driver layer to the integration layer (in both directions), and applying security/access/authentication rules, using an external system if necessary. It is appreciated, however, that these functions are only exemplary and the BRE is not limited to such functions.

At the interface layer, the software in the gateway interface may also interact with external systems based on the monitoring requirements. For example, the interface may include an email interface, a web interface, etc. The interface layer may also interface with the enterprise service bus ESB as a messaging system (for example, utilizing a protocol such as REST over HTTPS) to integrate data from all gateway interfaces and external systems into the data storage component of the integrity management system IMS. It is also appreciated that although the diagram illustrates an interface to the gateway interface, the gateway interface may also be directly connected or a part of integrity management system IMS.

The enterprise service bus ESB software is a messaging system similar to the IBM™ products MQueue Series and BMC Control. The ESB software, which in the instant embodiment is referred to as the data integration module part of the integrity management system IMS (although it is appreciated that the ESB could also be a separate entity), could be application such as Open ESB developed by Sun Microsystems™ or WSO2 ESB. A JAVA based programming language may be used as the programming language to achieve such software.

The Business Rules Engine BRE, the second layer, acts as the transformation processing of the captured data and applies rules which can be configured to represent a particular element of interest, such as a potential security incident or regroup all data related and useful for tax recollection purposes. The BRE monitors all activities and measuring points of all the drivers loaded, along with any physically or virtually connected devices. By accessing all of these measuring points in real time, the BRE can create new measuring points or data useful to create clustered events and clustered data in the integrity management system IMS. The BRE will also from the data collected, make association of data collected into objects, create events based on non-integrity of objects, create events-based alert or events-based on thresholds or on business rules or on trends, create tax related data clusters or tax related group of data. For example, measuring point A on a physically connected device (such as a temperature sensor) and measuring point B (such as a variable from an external software SCADA system) under specific thresholds can create new data based on both measuring point A and measuring point B. For example new data C may be created, where the new C data is an appendage of measuring points A and B and which can constitutes an event. This enables the BRE to correlate data for a better understanding of events as they occur. The events generated in the Gateway are based on the data collected from sensors, data collector or ICS systems. To these data which have been checked in their accuracy before entering in the Gateway, addition of attributes to the data to obtain enhanced data is made.

Another possibility, if the sensors, data collectors or ICS systems are not reliable or able to check the accuracy of the data, this step of checking is made in the Gateway. The events created in the Gateway will be useful in the DMS of the IMS to create the clustered events. The clustered events are used in the IMS to create and secure and reliable tax related data or KPI data or secure and reliable report related to the management of entities in the oil and gas supply chain and will allow in the context of the present invention to efficiently monitor the activity of the subsidiaries and franchises for example at the corporate level, but also reduce asymmetries in the oil and gas supply chain, but most importantly will allow to have an efficient tax recollection from at the corporate level but also at the state level.

The BRE may also act autonomously if enough physical and/or virtual information is available to determine, based on data collected events useful for creating in the integrity management system IMS clustered events and secure and reliable tax related data or KPI data or secure and reliable report related to the management of entities in the oil and gas supply chain without reliance on any external system, the clustered events will be useful to determine actions such as notifications to identify or alert security incidents and other actions, the secure and reliable tax related data or KPI data or secure and reliable report related to the management of entities in the oil and gas supply chain will be useful to correct asymmetries or incorrect data from different sources which will impact tax recollection revenue or correct management in the oil and gas supply chain. Definition(s) of the clustered events and secure and reliable tax related data or KPI data or secure and reliable report is managed via the data management module of the integrity management system IMS as part of the "learning" nature of the system. The BRE stores and queues, when necessary, these data and encrypts or signs each data to ensure the data is complete, authentic, accountable, non-repudiated, and protected from external access, modification, disruption and destruction. It is appreciated that any one or more, none or all of these features may be used, in addition to another form of functionality. The encrypted data may then be accessed by external systems based on, for example, security profiles of the system requesting the information.

Figure 10:
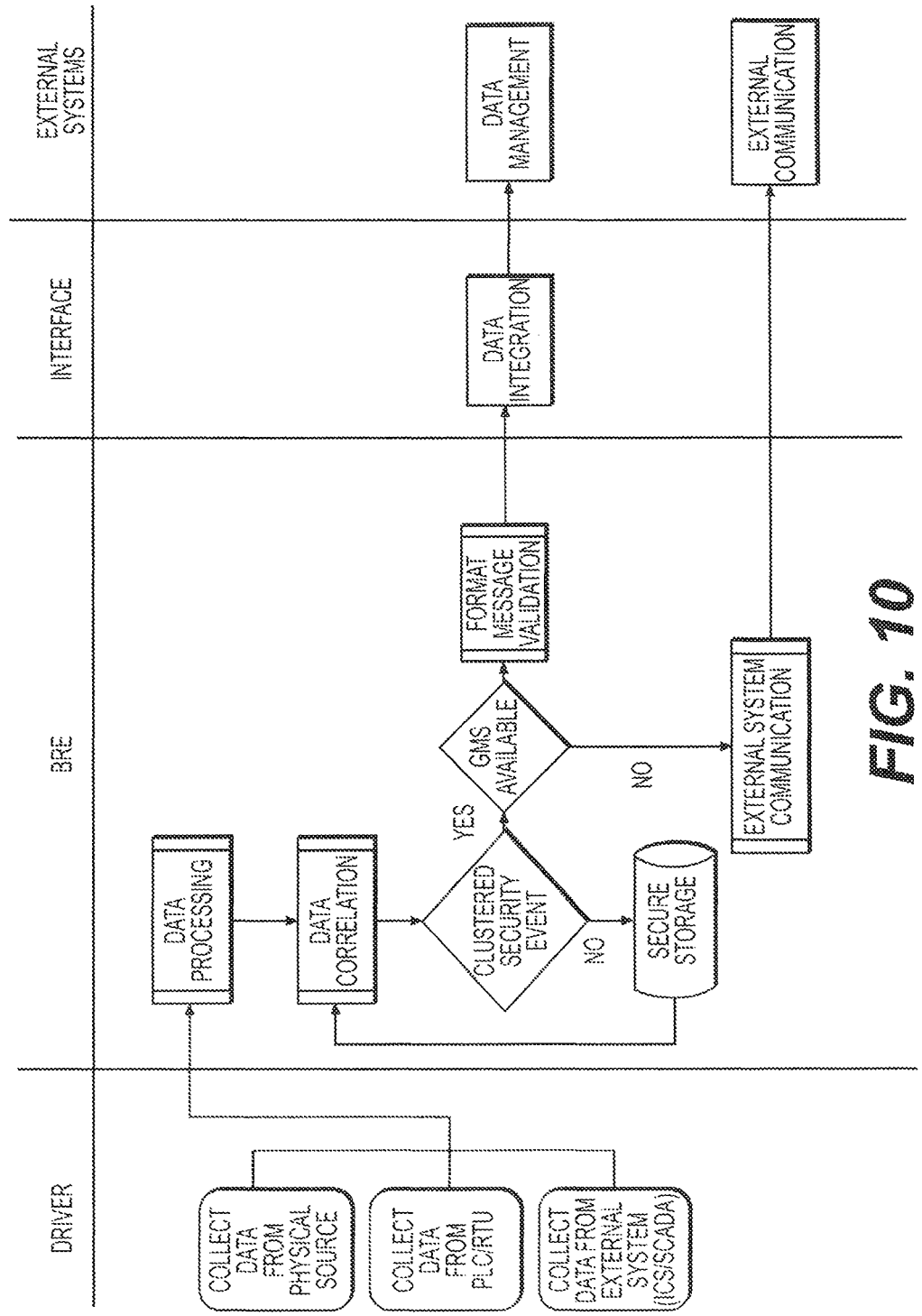
FIG. 10 is an exemplary embodiment of a process flow of the interface in accordance with one embodiment of the disclosure.

FIG. 10 is an exemplary embodiment of a process flow of the interface in accordance with one embodiment of the disclosure. The drivers of the gateway interface collect data from a variety of sources including, but not limited to, physical sources, programmable logic control (PLC) and remote terminal units (RTU) and any other type of source. The business rules engine BRE processes the data, correlates the data and creates from the data events or a sequence of events, as described in detail above. The data and events are optionally signed by a hardware or software security module (HSM or SSM). Events and enhanced data may be stored in a secure repository or data storage. The gateway then checks to determine where the data will be sent (IMS available), for example to the integrity management system IMS or another external system. If the integrity management system IMS is available, then the data or events are formatted and validated for use by the integrity management system. Data going to an external system may or may be formatted and validated depending on the external system requirements. Data or events being passed to the integrity management system IMS is sent to the data integration module, which stores the data or the events, acquires the data from storage, creates for example a key value data structure from the data, sorts the structure data and analyzes the structured data using computational models and algorithms to identify correlation between data useful for the creation of clustered events in the integrity management system IMS. The data is also checked for integrity of the structured data and the security of the structured data to prevent tampering. The data interface may be an independent interface or part of the data management system. If separate, the data is then passed along to the data management system for processing in accordance with the embodiments described above.

Accordingly, the present disclosure provides various systems, servers, methods, media, and programs. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An integrity management system managing operation and control between a first entity and a second entity in an oil and gas supply chain for detecting possible fraud or theft of oil and gas assets while traversing the supply chain, comprising:
   a data integration management module collecting data from:
   (i) a first plurality of industrial control systems collecting first data captured from a plurality of sensors and associated with oil and gas assets owned or under the control of the first entity, wherein the first entity comprises a corporate entity; and
   (ii) a second plurality of industrial control systems collecting second data captured from a plurality of sensors associated with the oil and gas assets of the first entity, wherein the second data is captured when the oil and gas assets are under the control of the second entity, wherein the second entity comprises at least one of a subsidiary, franchise and third party contractor associated with but independent of the first entity, wherein the second data is collected at points in the oil and gas supply chain of the oil and gas assets that are downstream in the supply chain from and subsequent to the collection of the first data;

at least one gateway transforming the first data collected from the first plurality of industrial control systems into secure first data and clustering said first data and transforming the second data collected from the second plurality of industrial control systems into secure second data and clustering said second data, wherein the first and second data is secured using at least a time stamp and attributes of said data, wherein the first and second data is clustered according to a sequence of events in which each event comprises a measurement taken over time along the supply chain by the plurality of sensors of the first and second plurality of industrial control systems, wherein the transforming comprises applying an algorithm to the sequence of events in real time to determine if a taxable transaction has occurred, wherein the first and second data each comprise tax related events which require action or reporting; and a data management system receiving the secured and clustered first data from the at least one gateway and further transforming them to generate for the corporate entity at least one of a secure tax report, a tax estimation and tax information related to a key performance indicator (KPI), and receiving the second data from the at least one gateway and further transforming them to generate at least one of a secure tax report, a tax estimation and tax information related to a key performance indicator (KPI) related to the at least one of the subsidiary, franchise and third party contractor of the oil and gas supply chain, wherein the integrity management system reports the secure and clustered first and second data generated by the data management system to a control system configured to:

create a first tax declaration from the secure and clustered first or second data based on the tax related events, wherein the integrity management system receives from the second entity a second tax declaration based on the same tax related events, wherein the integrity management system is configured to compare the first and second tax declarations to verify the accuracy of the second tax declaration corresponding to the first tax declaration and to reconcile the tax related events on which the first and second tax declarations are based to detect possible fraud or theft.

2. The integrity management system according to claim 1, wherein the secure and clustered first and second data are reported to:

an excise platform interface comprising:

a tax identification module to identify taxable transactions for reconciliation;

an operation reporting module computing and formatting the secured and clustered first and second data;

a tax compliance module to provide feedback of the formatted secured and clustered first and second data; and a data constructor to consolidate secured and clustered first and second data output from the tax identification module, the operation reporting module and the tax compliance module.

3. The integrity management system according to claim 2, wherein the excise platform interface receives the secured and clustered first and second data generated by the data management system, thereby enabling a third entity to compare and reconcile at least one of excise tax, tax collection and the KPI generated by at least one of the first and second entities.

4. The integrity management system according to claim 3, wherein the data management system comprising:

filtering and transforming the secured and clustered first and second data;

extracting and annotating the filtered and transformed secured and clustered first and second data;

correlating the extracted and annotated secured and clustered first and second data; and classifying the correlated secured and clustered first and second data; and sending the classified secured and clustered first and second data to a data warehouse and operational data storage.

5. The integrity management system according to claim 3, wherein the integrity management system interfaces with a tax remediation platform via an excise tax platform comprising a correlation engine receiving the consolidated secured and clustered first and second data from the excise platform interface to identify and reconcile asymmetries between the consolidated secured and clustered first and second data automatically generated by the excise platform interface and a corresponding one of the first and second tax declaration.

6. A method of managing operation and control between a first entity and a second entity in an oil and gas supply chain for detecting possible fraud or theft of oil and gas assets while traversing the supply chain, comprising:

collecting first and second data at a data integration management module, including:

capturing the first data associated with oil and gas assets owned or under the control of the first entity, from a plurality of sensors using a first plurality of industrial control systems, wherein the first entity comprises a corporate entity;

capturing the second data provided from a plurality of sensors associated with the oil and gas assets of the first entity, using a second plurality of industrial control systems, wherein the second data is captured when the oil and gas assets are under the control of the second entity, wherein the second entity comprises at least one of a subsidiary, franchise and third party contractor associated with but independent of the first entity, wherein the second data is collected points in the oil and gas supply chain of the oil and gas assets that are downstream in the supply chain from and subsequent to the collection of the first data;

at least one gateway, transforming the first data collected using the first plurality of industrial control systems into secure first data and clustering said first data and transforming the second data collected from the second plurality of industrial control systems into secure second data and clustering said second data, wherein the first and second data is secured using at least a time stamp and attributes of said data, wherein the first and second data is clustered according to a sequence of events in which each event comprises a measurement taken over time along the supply chain by the plurality of sensors of the first and second plurality of industrial control systems, wherein the transforming comprises applying an algorithm to the sequence of events in real time to determine if a taxable transaction has occurred, wherein the first and second data each comprise tax related events which require action or reporting;

and, at a data management system, receiving the secured and clustered first data from the at least one gateway and further transforming them to generate for the corporate entity at least one of a secure tax report, a tax estimation and tax information related to a key performance indicator (KPI), and receiving the second data from the at least one gateway and further transforming them to generate at least one of a secure tax report, a tax estimation and tax information related to a key performance indicator (KPI) related to the at least one of the subsidiary, franchise and third party contractor of the oil and gas supply chain, the method further comprising reporting, by the integrity management system, the secure and clustered first and second data generated by the data management system to a control system configured to create a first tax declaration from the secure and clustered first or second data based on the tax related events, wherein the integrity management system receives from the second subsidiary a second tax declaration based on the same tax related events, wherein the integrity management system is configured to compare the first and second tax declarations to verify the accuracy of the second tax declaration corresponding to the first tax declaration and to reconcile the tax related events on which the first and second tax declarations are based to detect possible fraud or theft.

7. The method according to claim 6, further comprising reporting the secure and clustered first and second data to an excise platform interface, the excise platform interface performs the method of:
identifying taxable transactions for reconciliation using a tax identification module;
computing and formatting the secured and clustered first and second data using an operation reporting module;
providing feedback of the formatted secured and clustered first and second data using a tax compliance module; and
consolidating secured and clustered first and second data output from the tax identification module, the operation reporting module and the tax compliance module using a data constructor.

8. The method according to claim 7, further comprises receiving, from a tax remediation platform comprising a correlation engine, the consolidated secured and clustered first and second data from the excise platform interface to identify and reconcile asymmetries between the consolidated secured and clustered first and second data automatically generated by the excise platform interface and a corresponding one of the first and second tax declaration.

9. The method according to claim 8, wherein the data management system performs the method of:
filtering and transforming the secured and clustered first and second data;
extracting and annotating the filtered and transformed secured and clustered first and second data;
correlating the extracted and annotated secured and clustered first and second data; and
classifying the correlated secured and clustered first and second data; and
sending the classified secured and clustered first and second data to a data warehouse and operational data storage.

10. The integrity management system according to claim 1, wherein the data integration management module also collects data captured from at least one data collector.

11. The integrity management system according to claim 1, wherein the system further comprises a barrel for carrying oil or fuel, the barrel comprising at least one sensor of the plurality of sensors, wherein the at least one sensor of the plurality of sensors is used to collect data from the barrel.

12. The integrity management system according to claim 1, wherein the system further comprises a tanker truck comprising at least one sensor of the plurality of sensors, wherein the at least one sensor of the plurality of sensors is a volume sensor used to measure one of the following: a volume of a content of a tank of the tanker truck or GPS localization of the tanker truck.

13. The integrity management system according to claim 1, wherein at least one sensor of the plurality of sensors is used to monitor a volume of fuel produced in a refining factory.

14. The integrity management system according to claim 1, wherein at least one sensor of the plurality of sensors is configured to sense data including at least one of temperature, density, flow rate, humidity, volume of oil and/or gas extracted, volume of oil and/or gas transported, volume of petrol sold at a gas station, gravity, chemical composition, pressure, weight, pressure variation of a pipeline, difference in weight of a vehicle or fuel volume, GPS localization, timing of a vehicle location, geographical region, imaging, pump volume delivery, quantity of fuel transported and number of barrels of fuel, thermal imaging, conductivity, rheology, turbidity.

15. The integrity management system according to claim 10, wherein the data collector is configured to collect data including an invoice, payment and cash management.

* * * * *